Dec. 7, 1971  J. W. HERNDON  3,624,925
PERISCOPE BREAKWATER SIMULATOR
Filed April 1, 1970
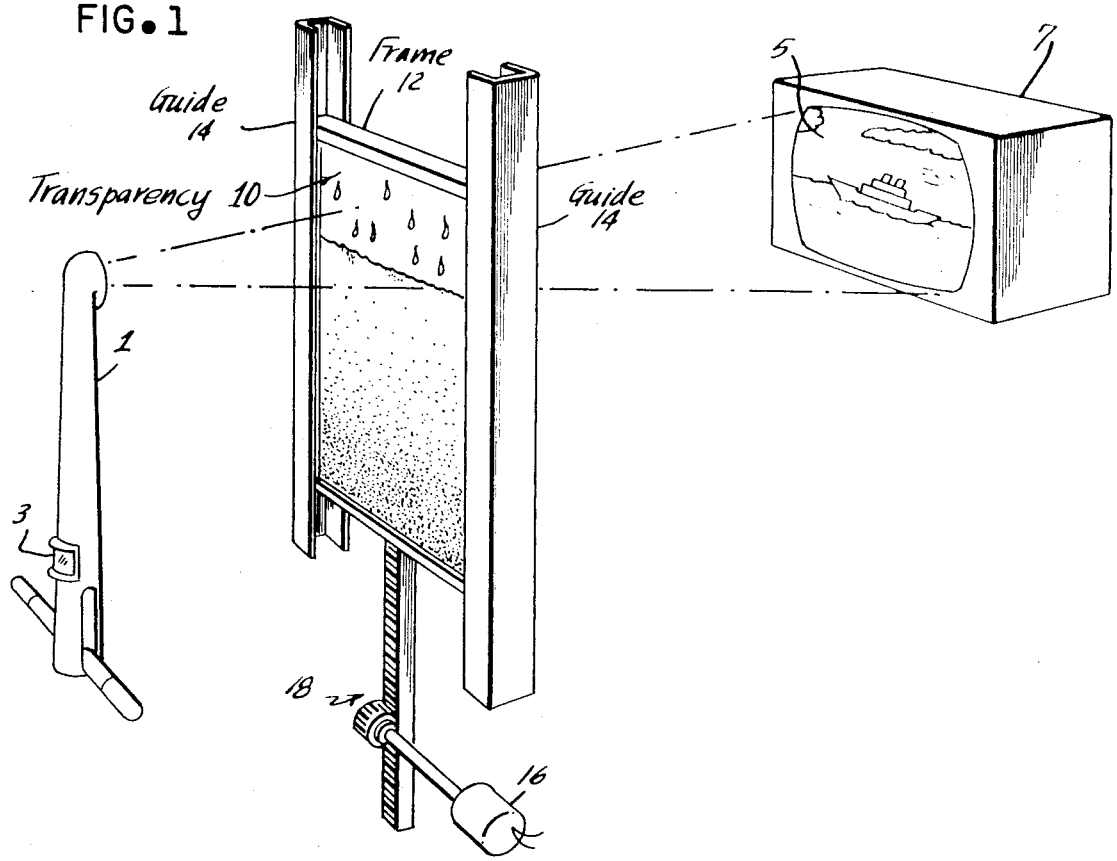
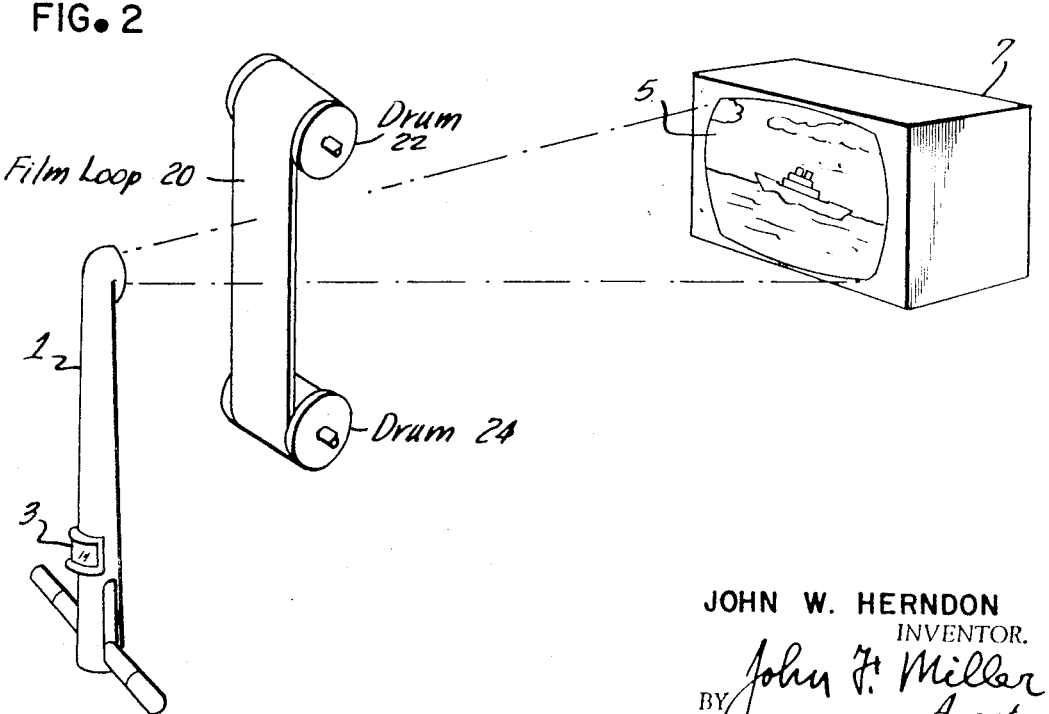
JOHN W. HERNDON
INVENTOR.

United States Patent Office 3,624,925
Patented Dec. 7, 1971

3,624,925
PERISCOPE BREAKWATER SIMULATOR
John W. Herndon, Orlando, Fla., assignor to the United States of America as represented by the Secretary of the Navy
Filed Apr. 1, 1970, Ser. No. 24,685
Int. Cl. G09b 9/00
U.S. Cl. 35—25
2 Claims

ABSTRACT OF THE DISCLOSURE

Provides means in a known periscope view simulator for generating the varying change of light effects observable during submarine periscope raising or surfacing operations and periscope lowering or submerging operations.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of training devices. As mechanisms such as ships, planes, tanks, submarines, etc., become more complex and expensive, training devices for training personnel to operate such mechanisms become essential. A single plane or submarine may cost many millions of dollars. It costs thousands of dollars per hour to operate and maintain a large plane or a submarine. Therefore training devices which enable a pilot, navigator, radar operator, or other specialist to acquire operating skills before ever taking off or going to sea are becoming increasingly necessary.

One training device which has proven to be very useful is a periscope view simulator. This device provides a mockup of the interior of a submarine complete with a functioning periscope. A submarine crewman can look through the eyepiece of the periscope and see a scene representing the sea surface complete with ships, planes, etc. The ships and planes may move across the sea and through the sky in a realistic manner.

One important phase of periscope operator training includes drill in periscope raising and lowering and submarine surfacing and submerging operations. Heretofore no means for simulating the change in light seen through a periscope when raising or lowering the periscope from a submerged position to a position above the surface, or vice versa, has been available. The invention supplies a means for simulating a periscope view of the surfacing-submerging operation which greatly enhances the training effectiveness of prior art periscope view simulators.

BRIEF DESCRIPTION OF THE DRAWINGS

FIG. 1 illustrates the principles of the invention.
FIG. 2 shows a second embodiment of the invention.

DESCRIPTION OF A PREFERRED EMBODIMENT

FIG. 1 shows the invention as applied to a known periscope view simulator. In such a periscope view simulator a periscope 1 is so arranged that a crewman looking through an eyepiece 3 observes a composite scene 5 on the screen of a television monitor 7. The scene 5 may compirse any desired background such as a view of the sea complete with objects such as ships, planes, etc. In known periscope view simulators such as are taught in U.S. Pats. Nos. 3,479,454, and 3,420,953, to Hanns H. Wolff, complex computer controlled circuits can cause objects such as ships, etc. to maneuver against a seascape comprising sea, horizon, and sky. The apparent position of a submarine containing a trainee who observes scene 5 through periscope 1 may also change.

The invention when used with a periscope view simulator such as taught in the Wolff patents comprises a transparency or similar replica 10 fastened in a frame 12. Frame 12 is moved upwards or downwards in two guides 14 by operation of a motor 16 which drives a connected rack and pinion assembly 18. Transparency 10 is shaded gradually from top to bottom. The bottom part of the transparency is opague, the top is transparent, and the area between changes gradually from transparent to opaque. In the center section of the transparency may be a replica of the sea surface complete with waves, spray, and water droplets such as might appear on the periscope lens.

When a "raise periscope" or "surface submarine" operation is being practiced, transparency 10 is in a raised position in guides 14 and is interposed in the field of view of periscope 1. The view seen through periscope 1 is dark because the opaque portion at the bottom of slide 10 blocks the light from the periscope head. As the simulated depth of the periscope is decreased, motor 16 which is connected by means not shown to the depth controls of the periscope view simulator, drives slide 10 downward to progressively move the less opaque parts of the slide past the objective lens of the periscope. This gradually permits more light to enter the periscope, thus realistically simulating the gradual increase from darkness to light as a periscope moves upward from darker depths towards the surface. When the periscope head is at a simulated depth equivalent to just breaking the surface of the sea, that part of the transparency showing waves, spray, and water droplets, is in the field of view. As the periscope rises further the clear portion of slide 10 is in the optical path thus simulating the light conditions affecting a periscope projecting some distance above the sea surface.

The slide 10 may be replaced by an equivalent, for example a film loop 20 as shown in FIG. 2. The duration of film movement past the head of periscope 1 is equal to that occurring during periscope movement from a first below the surface position, through the "break water" or periscope surfacing, and up above the sea surface to an operational height. Above the water detail in the film fades out as the periscope rises above the surface to allow only the scene generated by the periscope view simulator to be observed. The film loop is transported by appropriate means (represented here by drums 22 and 24) across the periscope optical path at a rate determined by the rate of change of the periscope elevation. The film loop embodies varying densities similar to those discussed in the description of slide 10. As the surface is approached by the periscope head from below, wave action, splash, etc., can be observed. The film can be varied for different conditions such as those encountered when a surface vessel is overhead, for different surface conditions, etc. Instead of a film loop a video tape could be used to insert splash, water droplets, and other effects directly into the periscope view simulator circuits.

What is claimed is:
1. In a periscope view simulator wherein a scene representing the view through a periscope is observed, and having periscope depth controls, the improvement comprising:
variable light transmitting means for simulating the changing illumination of the view seen through a submarine periscope as the periscope changes depth, said means comprising movable means for transmitting a gradually increasing amount of light as the said periscope ascends and for gradually decreasing the supply of light as the said periscope descends, there- by simulating the darker and lighter conditions observable at greater and lesser depths, said variable light transmitting means being responsive to said periscope depth controls, said variable light transmitting means comprising a transparency movably positioned in the field of view of said periscope, said transparency having a more opaque section and a more transparent section, means for moving said transparency from a first position wherein said more opaque section admits less light to said periscope towards a second position wherein said more transparent section admits more light to said periscope as the depth of said periscope is decreased, said variable light transmitting means comprising a film of variable density positioned for movement in the optical path of said periscope, and means for moving said film in the said optical path of said periscope at a rate proportional to the rate of the simulated vertical movement of said periscope.

2. The apparatus of claim 1, said transparency having an intermediate section located between said more opaque section and said more transparent section, means simulating the appearance of spray and water droplets positioned on said intermediate section whereby the visual effects of spray and water droplets on the periscope lens are simulated in the periscope view when said intermediate section is interposed in the periscope view.

References Cited

UNITED STATES PATENTS

| | | | |
|---|---|---|---|
| 3,427,730 | 2/1969 | Noxon | 35—12 N |
| 3,234,665 | 2/1966 | Sear et al. | 35—12 N X |

WM. H. GRIEB, Primary Examiner